A. MONTAN.
FOLDING LAVATORY OUTFIT FOR AUTOMOBILES AND THE LIKE.
APPLICATION FILED JAN. 3, 1918.
1,289,225.
Patented Dec. 31, 1918.
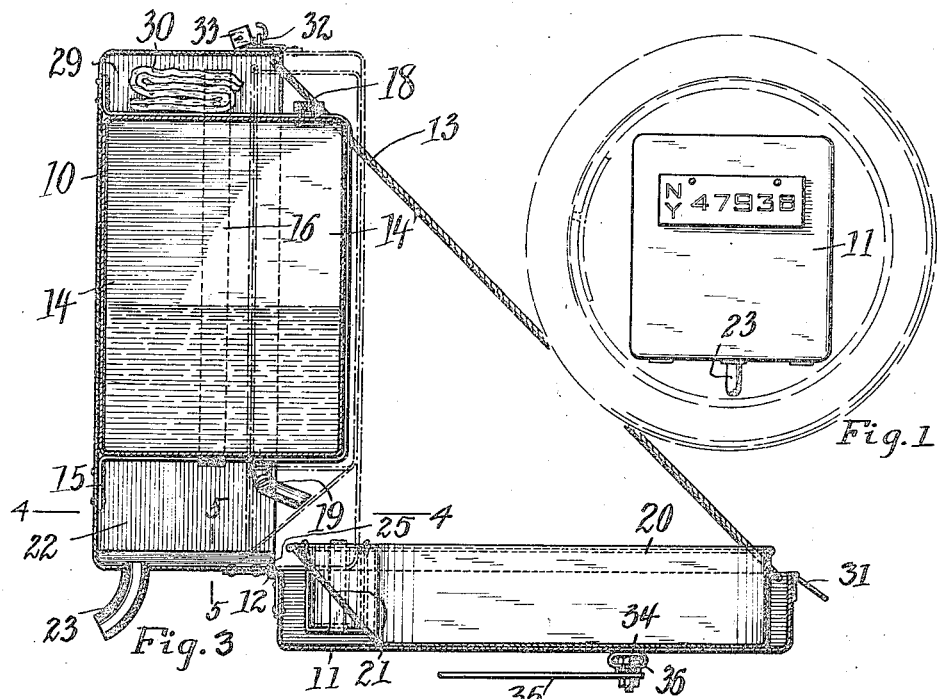
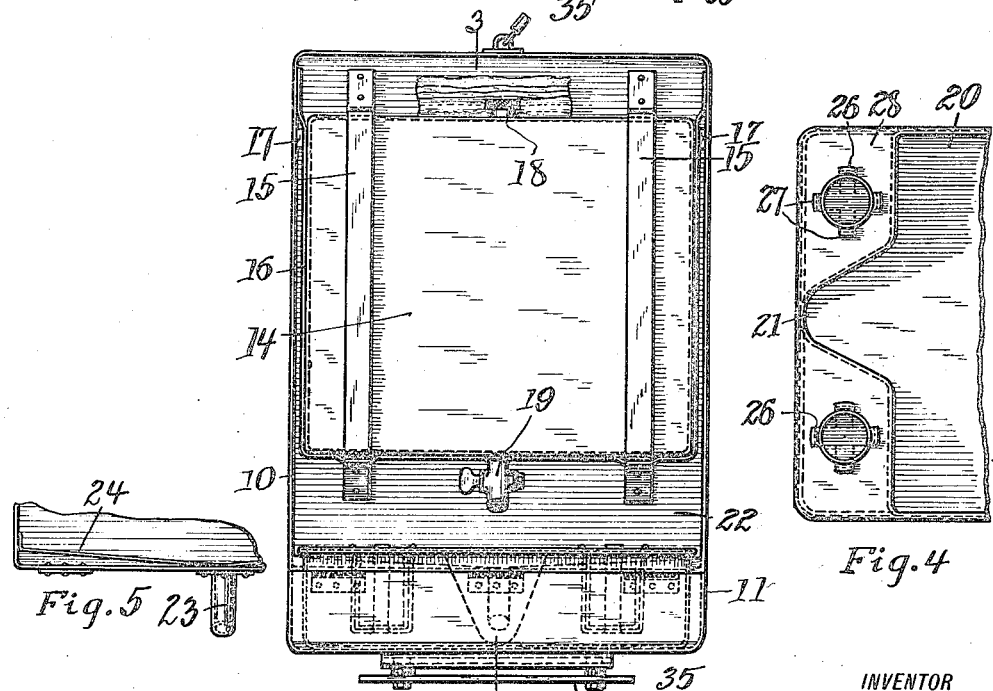
INVENTOR
Adolph Montan
BY
Dyke & Canfield
ATTORNEYS

UNITED STATES PATENT OFFICE.

ADOLPH MONTAN, OF WEST ORANGE, NEW JERSEY.

FOLDING LAVATORY OUTFIT FOR AUTOMOBILES AND THE LIKE.

1,289,225. Specification of Letters Patent. Patented Dec. 31, 1918.

Application filed January 3, 1918. Serial No. 210,141.

*To all whom it may concern:*

Be it known that I, ADOLPH MONTAN, a citizen of the United States, and a resident of West Orange, county of Essex, and State of New Jersey, have invented certain new and useful Improvements in Folding Lavatory Outfits for Automobiles and the like, of which the following is a specification.

My invention relates to a folding lavatory equipment more especially adapted for use with automobiles and the like, though it may be made use of wherever a compact folding lavatory equipment is desired. When applied to an automobile it may be attached at any convenient location, as, for example, within the carrier for the spare tire, with which automobiles are usually provided.

The object of the present invention is the improvement of devices of this character in a number of important respects, as are more fully hereinafter pointed out, and with the foregoing and related objects in view, my invention consists in the parts, improvements, combinations and structures herein set forth and claimed.

The accompanying drawing, forming a part of this specification and wherein the same reference numerals are applied uniformly to designate the same parts throughout, illustrates one embodiment of my invention. In said drawing, Figure 1 is a rear face view of a lavatory outfit mounted within the support for the spare tire of an automobile. Fig. 2 is a rear view of the outfit in an opened position. Fig. 3 is a transverse sectional view taken substantially on the line 3—3, Fig. 2. Fig. 4 is a fragmentary plan view of the wash basin showing holding means for soap and the like, and Fig. 5 is a fragmentary detail view showing the preferred arrangement for draining.

The lavatory equipment is illustrated in Fig. 1 in connection with an automobile spare tire and the holding ring therefor customarily mounted upon the rear of the automobile tonneau. Inasmuch as such spare tire holding devices vary considerably in different machines, it is not thought necessary to illustrate the attaching means, as it will be readily understood that any convenient form of attaching means adapted for use with the particular tire holding ring or other support to which the outfit is to be attached, may be resorted to as circumstances may require.

The outfit includes a casing with a closure therefor, a water tank supported in the casing and a wash basin supported in the cover for the casing, and in the form shown the casing is designated by the numeral 10, it preferably being of stamped sheet metal as is also the closure portion 11 which is hinged to the part 10, as at 12, the hinged connection between the closure 11 and casing 10 being preferably at the lower portion thereof so that the closure 11 may be opened to a horizontal position, as shown in Fig. 3. Suitable means for stopping and supporting the closure 11 in substantially horizontal position are provided and may have the form of a chain, cord or the like 13, which is preferably attached to the closure 11 and also to the casing 10 at convenient points. The water tank 14 is supported within the casing and may be secured thereto as by means of straps 15, 15 arranged substantially parallel to the sides of the casing 10 and securing the tank to the front wall of the casing, and also by means of a strap or straps 16 running substantially parallel to the front wall of the casing and securing the tank to the sides of the casing. These straps may conveniently be of band iron or other metal and may be riveted or otherwise secured in place so as to secure a firm and substantial support for the tank 14 within the casing 10. The tank is preferably spaced away from the side walls of the casing as by means of spacing blocks or the like 17, 17. The tank 14 preferably extends beyond the casing proper, as indicated at 14′, this portion of it being inclosed by the closure 11, and the tank is preferably provided at the upper rear portion thereof with a readily accessible filling opening having a cap 18, and is provided at the bottom thereof with a faucet 19 for drawing off the water. The cap 18 may be loosened to provide an air vent when drawing off the water, or an air vent may be otherwise provided, if desired.

The closure 11 may itself serve as a wash basin, but preferably there is provided within the cover 11 a removable wash basin 20 of such form as to fit fairly closely within the closure 11, and the basin is provided with water inlet means adapted to be received beneath the faucet 19. In the form shown such inlet means take the form of a spout 21. Where the separate wash basin 20 is provided it is of such form as to be adapted to fit over the projecting portion 14' of the tank 14 and to partially inclose the same when the closure 11 is in closed position, as indicated, for example, in dotted lines in Fig. 3. Means are provided for making a clean discharge of the water from the wash basin when the latter is turned over by closing the cover 11 after use. In the form shown the spout 21 discharges into the compartment 22 in the bottom of the tank 10, and the same is preferably provided with means for directing the water discharged therein from the spout 21 out through the discharge pipe 23, and in the form shown such directing means takes the form of plates 24 secured to the bottom of the casing 10 on each side of the center thereof and downwardly inclined toward the center so that any water deposited therein from the spout 21 may flow down over such plates and outwardly through the discharge pipe 23. The compartment 22 has a low rear wall 25 which is adapted to prevent the water discharged into said compartment from running out at the rear thereof, and the spout 21 is so arranged as to clear such wall 24 when the device is closed.

Means are preferably provided for the convenient reception and secure holding of detergents, soap or the like, and in the form shown, within the closure 11 on each side of the spout 21, and in the form shown holders 26 comprising a plurality of spring fingers 27 are provided, within which cakes of soap, detergent material and the like may be received and securely held. Such holders may be supported in any desired way, but in the form shown the wash basin 20 is provided with a partial top plate having openings 28 therein on each side of the spout 21, and the holding devices 26 are secured in openings formed therein. With such arrangement the detergents, soap, eac., are securely held in place and can not get loose and rattle around.

Provision is also made for the storage of other devices, as, for example, towels, and in the form shown the top of the tank 14 is at such distance below the top of the casing 10 as to provide a compartment 29 above the top of the tank within the casing, within which towels and the like may be placed, a single towel 30 being illustrated as placed in the compartment 29.

Any suitable means may be resorted to for holding the closure 11 in closed position, and in the form shown the closure 11 is provided with a slotted hasp 31 hinged thereto, and the casing 10 with an upwardly extending staple 32 provided with a padlock 33 for securing the hasp in place thereon when the outfit is closed.

If desired, provision may be made for the attachment of other automobile parts to the device. For example, it may be desired to carry a number plate within the same location as the lavatory apparatus, and in such case bolt retaining means such as a channel bar 34 may be soldered or otherwise secured thereto and a number plate 35 attached as by means of bolts 36 having their heads received within the channel bar 34.

It will be seen that a lavatory outfit in accordance with my invention possesses a number of advantageous features. It is very compact, considerable quantities of water may be carried, provision is made for storage of the necessary appurtenances without the same becoming loose and making trouble by rattling around, it is convenient for use, all that is necessary being to open the cover of the compartment and to turn the water on by means of the faucet 19, and after use the dirty wash water is automatically discharged by the closing of the cover, so that the wash basin may be permitted to remain within the cover at all times and it is not necessary to remove it for emptying the water, though it may be removed for separate use, if desired.

It will be understood that the embodiment of my invention which has been shown and described is for the purpose of affording a clear understanding of the invention only, and that I am not to be limited thereto, but that changes and modifications may be made within the scope of my claims and without departing from my invention or sacrificing any of its advantages.

I claim:

1. In a device of the class described, the combination of a casing, a water tank supported therein above the bottom of the casing, a water discharge compartment below the tank within the casing and having an outlet at the rear thereof, a hinged cover for said casing and extending substantially from top to bottom thereof, and a wash basin in said cover having a spout adapted to discharge into said outlet compartment, the bottom of the discharge compartment being above the bottom of the wash basin when the cover is in opened position.

2. In a folding lavatory outfit, a casing, a water tank therein and supported away from the sides thereof, said water tank projecting beyond the casing, a cover for said casing hinged thereto at its bottom and adapted to contain a wash basin, said wash basin being formed to inclose the projecting portion of the tank, and said tank having a filling opening in its top beyond the casing.

3. In a folding automobile lavatory outfit, a casing having a flat bottom, a cover hinged to said flat bottom of said casing, said casing having an inner false bottom tapering downwardly on each side, a discharge outlet at the lower portion thereof, and a wash basin within the cover having a spout adapted to discharge water onto said false bottom, the bottom of the discharge compartment being above the bottom of the wash basin when the cover is in opened position.

4. In a folding automobile lavatory outfit, a casing having a tank therein spaced away from the top and bottom of the casing, a cover for said casing hinged thereto at its bottom, a wash basin in said cover having recesses therein provided with spring means for holding detergent materials, said wash basin being of a form to substantially fit over and inclose a portion of said tank, and said tank leaving room above it within the casing for the reception of towels and the like.

5. In a folding lavatory outfit, a casing comprising a body portion and a cover hinged to the bottom wall of the body portion, a tank secured in place in the upper part of the body portion and projecting forwardly therebeyond and adapted to be entirely inclosed within the casing when the cover is shut, a wash basin in said cover and adapted to fit over the projecting portion of the tank, said wash basin having a spout which is located in front of the hinged cover joint when the cover is open and back of such joint when the cover is closed, and an outlet pipe in the lower rear part of the casing for conducting away waste water when the basin is emptied upon closing the cover.

In testimony that I claim the foregoing, I have hereto set my hand, this 22nd day of December, 1917.

ADOLPH MONTAN.